United States Patent

[11] 3,622,518

| [72] | Inventors | James G. Atherton<br>Roselle;<br>Harold C. Nemeth, Chicago, both of Ill. |
|---|---|---|
| [21] | Appl. No. | 763,379 |
| [22] | Filed | Sept. 27, 1968 |
| [45] | Patented | Nov. 23, 1971 |
| [73] | Assignee | Armour Industrial Chemical Company<br>Chicago, Ill. |

[54] WATER-IN-OIL INVERT EMULSIONS
10 Claims, No Drawings

[52] U.S. Cl.................................................... 252/309,
252/357, 424/70
[51] Int. Cl..................................................... B01j 13/00

[50] Field of Search............................................ 252/309,
308, 357

[56] References Cited
UNITED STATES PATENTS

| 2,144,808 | 1/1939 | Parker........................... | 252/309 |
| 3,492,352 | 1/1970 | Miller et al. .................. | 252/311.5 |

Primary Examiner—John D. Welsh
Attorney—Francis W. Young

ABSTRACT: Invert emulsions containing arylaliphatic acid salts of alkoxylated arylaliphatic amines.

WATER-IN-OIL INVERT EMULSIONS

Invert emulsions of the water-in-oil type, in which droplets of water dispersed in the continuous phase of oil, have been developed in recent years for usage in such fields as agriculture for use as pesticide emulsions; secondary oil recovery such as for use in drilling fluids; specialty cleaners and/or polishes; hydraulic fluids, particularly of the fire-resistant types; cosmetic preparations such as lotion-type hair creams, brushless shaving creams, cold creams, etc.; and various other products.

In preparing and employing such emulsions, however, several difficulties have been encountered. One of the principal difficulties arises from the fact that few emulsifiers effectively form water-in-oil emulsions that contain more water than oil. When such an emulsifier is found, it is generally due to empirical observation as there is no effective means to predict whether known emulsifiers will form invert emulsions that will contain more water than oil.

It is also desirable that emulsions for the hereinabove described uses and others contain a low concentration of emulsifying agent, as the emulsifying agent is a large contributor to the total cost of the cosmetic product, drilling fluid, hydraulic fluid, etc. It is further desirable that such emulsions be stable and not subject to contamination by other ingredients or matter in the environment which often tend to break emulsions. Emulsifiers with which invert emulsions containing the above properties can be prepared are rare.

This invention, therefore, pertains to water-in-oil invert emulsions which overcome the hereinabove objections and achieve the above described advantages. More particularly, the invention provides stable water-in-oil emulsions comprising, on a basis of 100 parts by weight of emulsion, from about 50 to about 75 parts by weight of water, from about 5 to 30 parts by weight of oil, and from about 1 to about 10 parts by weight of an emulsifying agent consisting essentially of an arylaliphatic acid salt of an alkoxylated arylaliphatic amine. Even more specifically, the invention provides in a preferred embodiment stable water-in-oil emulsions having a high water content and being of interest to the agricultural, oil recovery, hydraulic fluid, and cosmetic arts, comprising, on a basis of 100 parts by weight of the emulsion, about 70–75 parts by weight of water, about 20–25 parts by weight of oil, and about 1–4 parts by weight of a phenylstearic acid salt of ethoxylated (1–15 moles and preferably 1–3 moles) phenylstearylamine.

Preferred alkoxylated arylaliphatic amines for use in this invention are substantially as described in U.S. Pat. application, Ser. No. 590,474, filed Oct. 31, 1966 and entitled "Aryl-Substituted Aliphatic Tertiary Amines," now Pat. No. 3,492,352, and may be represented by the following structural formula:

$$CH_3-(CH_2)_x-CH-(CH_2)_y-CH_2N\begin{matrix}R_1\\R_2\end{matrix}$$
$$|$$
$$R$$

wherein $x$ and $y$ each is an integer from 0 to 19 and the sum of $x$ and $y$ is an integer from 8 to 19; R is an aryl group selected from phenyl, naphthyl, and phenyl substituted with from 1 to 2 groups selected from methyl, hydroxy, methoxy and phenoxy; and $R_1$ and $R_2$ are selected from 1. $-(CH_2CH_2O)_pH$ for $R_1$ and $-(CH_2CH_2O)_rH$ for $R_2$ and (2) 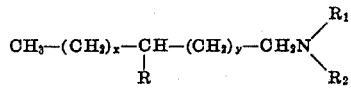

In a preferred subclass, $p$ and $r$ are integers from 0 to 15 provided their sum is an integer of 1 to 15. Values of $p$ and $r$ being 0–5 are especially preferred. Such ingredients may be prepared as described in the above-cited application. Particularly good results are obtained when this ingredient is phenylstearyl amine 2 mole ethoxylate having the formula:

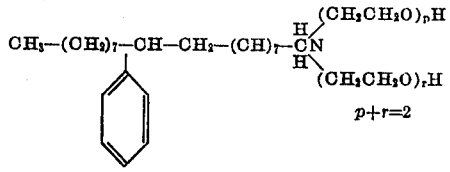

$p+r=2$

This alkoxylated arylaliphatic amine ingredient is combined in about molar ratio with an arylaliphatic acid within the terms of arylaliphatic hereinabove, and preferable phenylstearic acid. Although these two ingredients are preferably in about equimolar ratios, it should be understood that slightly more or less of either may be used but without substantial further advantage.

The water phase, or dispersed phase, of the emulsion can consist of fresh water, salt water, or sea water and the like. The presence of mineral salts such as sodium chloride, calcium carbonate, or calcium sulfonate has no effect on the stability of the emulsion. The water concentration should be within the range of about 50 to about 75 parts by weight, on the basis of 100 parts of the total emulsion composition. This concentration range produces from thin to very viscous invert emulsions; a preferred range of about 70 to 75 parts by weight of water produces a medium to high-viscosity emulsion. The exact concentration depends upon the particular application for which the invert emulsion is to be used.

The oil phase, or continuous phase, can comprise any nonpolar hydrophobic solvent conventionally used in forming water-in-oil emulsions. Mineral oil in its various forms and qualities is generally preferred, and petroleum oils generally such as diesel oil, crude oil, gas oil, kerosene and the like may be employed. The oil used depends upon the particular application for which the emulsion is to be used. The amount of oil should be within the range of from about 5 to about 30 parts by weight and preferable 20–25 parts by weight, on the basis of 100 parts of the total invert emulsion composition.

The process of forming the invert emulsions of the invention may be performed either batchwise or continuously, using any suitable mixing equipment, such as appropriate sized mixing vessels and a Lightnin mixer (high-speed propellor-type mixer manufactured by Mixing Equipment Company, Inc.), cream-type mixer and the like. The ingredients may be added in any order, but it is preferable to add alkoxylated amine and then arylaliphatic acid, in this order, to the oil. It is desirable that the water be added last.

The temperature of forming the invert emulsions is not critical, and may vary widely. The temperature may be adjusted for making certain emulsion products, as is well known in the art, such as warming to about 60°–80° C. for cosmetic products in order to easily incorporate optional additional ingredients such as waxes and cetyl alcohol. As the formation of the invert emulsions is exothermic, the temperature may be adjusted by cooling the vessel, using cooled water in forming the invert emulsions, and similar means.

The following specific examples are submitted to illustrate but not to limit this invention.

EXAMPLE I

An especially preferred invert emulsion was prepared by adding, in the quantities set forth in table I, the alkoxylated arylaliphatic amine and arylaliphatic acid to mineral oil and heating to about 60° C. In another container, water is heated to a temperature of about 60° C. The water is slowly added to the oil while stirring the oil with a propellor-type agitator. Stirring is continued until the temperature reaches 50° C.

The resulting emulsion was examined and found to be an invert emulsion. It may be noted from table I that the use of less than 3 weight percent emulsifier on the basis of the total emulsion composition or less than 10 percent emulsifier on the basis of the oil phase, results in an excellent invert emulsion containing about 75 percent water.

TABLE I

|  | % by weight |
| --- | --- |
| Mineral oil | 23.66% |
| Phenylstearic acid | 1.04 |
| Phenylstearyl amine (2 mole) ethoxylate | 1.32 |
| Water | 73.98 |
| % emulsifier: basis oil | 9.07% |
| Emulsion type: oil-in-water or invert water-in-oil | |

EXAMPLE II

In like manner as set forth in example I, an invert emulsion can be prepared using phenylstearic acid and phenylstearic amine (15 mole) ethoxylate.

EXAMPLE III

In similar fashion as set forth hereinabove, invert emulsions can be made using arylaliphatic acid and alkoxylated arylaliphatic amines wherein arylaliphatic is phenyl, hydroxyphenyl, tolyl, anisyl, naphthyl, methoxyphenyl and phenoxy and the like.

EXAMPLE IV

This emulsion as prepared in examples I–III may be used in preparing a lotion-type hair cream which exhibits excellent properties of stability, ease of preparation, feel and appearance. The composition of the hair cream is:

|  | % by weight |
| --- | --- |
| Mineral oil | 17.35% |
| Phenylstearic acid | 1.04 |
| Phenylstearyl amine (2 mole) ethoxylate | 1.32 |
| Isopropyl myristate | 6.00 |
| Water | 75.00 |
| % emulsifier basis oil: | 6.60% |
| Emulsion type: oil-in-water or invert water-in-oil | |

While this invention has been described with respect to specific embodiments of invert water-in-oil emulsions and the use therein of particular emulsifiers of this invention, such is by way of illustration and not in limitation; and it is to be understood that variations and modifications thereof obvious to those skilled in the art may be made without departing from the spirit or scope of the invention.

We claim:

1. Water-in-oil invert emulsion compositions comprising about 50 to 75 wt. percent water, about 5 to 30 wt. percent oil, and as an emulsifying agent about 1 to 10 wt. percent of an arylaliphatic acid salt of an arylaliphatic amine, said amine having the formula

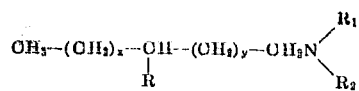

wherein $x$ and $y$ each is an integer from 0 to 19 and the sum of $x$ and $y$ is from 8 to 19; R is an aryl group selected from phenyl, naphthyl, and phenyl substituted with from 1 to 2 groups selected from methyl, hydroxy, methoxy and phenoxy; and $R_1$ and $R_2$ are selected from 1. $-(CH_2CH_2O)_pH$ for $R_1$ and $-(CH_2CH_2O)_rH$ for $R_2$ and (2) $-\left(\underset{\underset{\displaystyle CHCH_2O}{|}}{\overset{\displaystyle CH_3}{}}\right)_pH$ for $R_1$ and $-\left(\underset{\underset{\displaystyle CHCH_2O}{|}}{\overset{\displaystyle CH_3}{}}\right)_rH$ for $R_2$ $p$ and $r$ are integers from 0 to 15 provided their sum is an integer from 1 to 15, and said acid has the formula

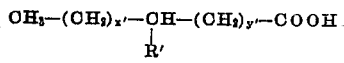

wherein $x'$, $y'$ and $R'$ are selected from the groups set forth above for $x$, $y$ and R, respectively.

2. The composition of claim 1 wherein said water is about 70 to 75 wt. percent and said oil is about 20 to 25 wt. percent, based upon the total weight of said composition.

3. The composition of claim 1 in which the sum of $p$ and $r$ is from 1 to 5.

4. The composition of claim 1 in which R is phenyl.

5. The composition of claim 1 in which R is phenyl; the sum of $x$ and $y$ is 15; the sum of $p$ and $r$ is 1 to 5; and said arylaliphatic acid and said alkoxylated arylaliphatic amine are present in about equimolar ratio.

6. Water-in-oil invert emulsions consisting essentially of on a basis of 100 parts by weight, from about 70–75 parts water, from about 5–30 parts oil, and from about 1–10 parts of an emulsifying agent consisting essentially of a phenylstearic acid salt of phenylstearyl amine 1–3 mole alkoxylate, said phenylstearic acid and said phenylstearyl amine alkoxylate being present in about equimolar ratio.

7. The composition of claim 6 in which said alkoxylate is an ethoxylate.

8. The composition of claim 6 in which said alkoxylate is a propoxylate.

9. The composition of claim 6 in which said oil is mineral oil.

10. Water-in-oil invert emulsion compositions consisting essentially of about 70 to 75 wt. percent water, about 5 to 30 wt. percent oil, and about 1 to 10 wt. percent of the phenylstearic acid salt of bis(beta-hydroxyethyl) phenylstearyl amine.

* * * * *